(12) United States Patent
Wheeler et al.

(10) Patent No.: US 7,255,019 B2
(45) Date of Patent: Aug. 14, 2007

(54) METHOD OF DETECTING FALSE NEUTRAL IN AN AUTOMATED TRANSMISSION SYSTEM

(75) Inventors: Robert S. Wheeler, Redditch (GB);
Anthony Stasik, Portage, MI (US);
Jeffrey P. Hawarden, Lancashire (GB);
Kwok W. Chan, Manchester (GB)

(73) Assignee: Eaton Corporation, Cleveland, OH (US)

( * ) Notice: Subject to any disclaimer, the term of this patent is extended or adjusted under 35 U.S.C. 154(b) by 193 days.

(21) Appl. No.: 10/517,850

(22) PCT Filed: Jun. 18, 2003

(86) PCT No.: PCT/EP03/06422

§ 371 (c)(1),
(2), (4) Date: Jun. 27, 2005

(87) PCT Pub. No.: WO03/106867

PCT Pub. Date: Dec. 24, 2003

(65) Prior Publication Data

US 2006/0234831 A1 Oct. 19, 2006

(30) Foreign Application Priority Data

Jun. 18, 2002 (GB) ................... 0213937.6

(51) Int. Cl.
*F16H 59/00* (2006.01)

(52) U.S. Cl. .................................. 74/336 R

(58) Field of Classification Search ............... 477/115, 477/120, 904, 906, 907; 701/51–66; 73/335; 74/337, 339, 336 R See application file for complete search history.

(56) References Cited

U.S. PATENT DOCUMENTS

| 4,361,060 | A | | 11/1982 | Smyth | |
|---|---|---|---|---|---|
| 4,576,065 | A | | 3/1986 | Speranza et al. | |
| 4,648,290 | A | | 3/1987 | Dunkley et al. | |
| 4,702,127 | A | * | 10/1987 | Cote | 477/75 |
| 4,722,248 | A | | 2/1988 | Braun | |
| 4,850,236 | A | | 7/1989 | Braun | |
| 4,916,979 | A | | 4/1990 | Irwin | |
| 4,933,850 | A | * | 6/1990 | Wheeler | 701/56 |
| 4,945,484 | A | * | 7/1990 | Cote et al. | 701/63 |
| 5,086,659 | A | | 2/1992 | Earp | |
| 5,157,607 | A | * | 10/1992 | Stainton et al. | 701/62 |

(Continued)

FOREIGN PATENT DOCUMENTS

EP    0 242 086    6/1990

(Continued)

OTHER PUBLICATIONS

International Search Report (3 pages).

*Primary Examiner*—Saul Rodriguez
*Assistant Examiner*—Justin K. Holmes

(57) ABSTRACT

A method and system for controlling downshifting in an automated mechanical transmission system (10) utilized on a vehicle. When an automatic power downshift from a currently engaged ratio (GR) is required, the engine acceleration (EA) is monitored and compared with an engine free acceleration (EFA) to detect a false Neutral condition and to take appropriate action accordingly. Alternatively, a false Neutral condition is detected when the Absolute Value of the rotational speed of the output shaft (OS) times the currently engaged gear ratio (GR) minus the rotational speed of the input shaft (IS) is less than a predetermined value (ABS ((OS*GR)−IS)).

8 Claims, 4 Drawing Sheets

U.S. PATENT DOCUMENTS

| | | |
|---|---|---|
| 5,272,939 A | 12/1993 | Markyvech et al. |
| 5,315,514 A | 5/1994 | Steeby et al. |
| 5,335,566 A | 8/1994 | Genise et al. |
| 5,389,053 A | 2/1995 | Steeby et al. |
| 5,409,432 A | 4/1995 | Steeby |
| 5,411,450 A | 5/1995 | Gratton et al. |
| 5,425,689 A | 6/1995 | Genise |
| 5,435,212 A | 7/1995 | Menig |
| 5,479,345 A | 12/1995 | Amsallen |
| 5,487,004 A | 1/1996 | Amsallen |
| 5,489,247 A | 2/1996 | Markyvech et al. |
| 5,490,063 A | 2/1996 | Genise |
| 5,509,867 A | 4/1996 | Genise |
| 5,533,946 A | 7/1996 | Markyvech |
| 5,582,069 A | 12/1996 | Genise |
| 5,620,392 A | 4/1997 | Genise |
| 5,713,445 A | 2/1998 | Davis et al. |
| 5,755,639 A | 5/1998 | Genise et al. |
| 5,911,787 A | 6/1999 | Walker |
| 5,974,354 A * | 10/1999 | Janecke et al. ............... 701/64 |
| 6,055,469 A * | 4/2000 | Shoji et al. ................... 701/34 |
| 6,266,571 B1 | 7/2001 | Fado et al. |
| 6,840,126 B1 * | 1/2005 | Stine et al. ............... 74/336 R |

FOREIGN PATENT DOCUMENTS

| | | |
|---|---|---|
| EP | 0 241 216 | 6/1991 |
| EP | 0 725 237 | 4/1998 |
| EP | 0 857 897 | 8/1998 |

* cited by examiner

METHOD OF DETECTING FALSE NEUTRAL IN AN AUTOMATED TRANSMISSION SYSTEM

BACKGROUND OF THE INVENTION

1. Field of the Invention

The present invention relates to a control method/system for controlling downshifting in an at least partially automated mechanical transmission system. In particular, the present invention relates to the control of downshifting in a vehicular automated mechanical transmission system wherein the control system senses fault conditions in which the control system believes the transmission system is in neutral while the transmission system is actually in a gear during downshift synchronization.

2. Description of the Related Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639. The use of engine brakes (also known as compression brakes, exhaust brakes or Jake brakes) or other input shaft retarding devices, such as inertia brakes, and transmission controls utilizing same are known in the prior art, as may be seen by reference to U.S. Pat. Nos. 5,086,659; 5,409,432; 5,425,689 and 5,713,445.

Control, for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

SUMMARY OF THE INVENTION

The present invention provides a control for a vehicular automated mechanical transmission system, which will sense conditions indicative of downshifting from a currently engaged gear ratio, and will evaluate fault conditions in which the control system believes the transmission system is in Neutral while the transmission system is actually in a gear during downshift synchronization.

The foregoing is accomplished, in an embodiment of the invention, by (a) determining an Engine Acceleration (EA) rate during a downshift, such as an automatic downshift, from a currently engaged ratio (GR) to a desired downshift target gear ratio ($GR_{TARGET}$), and (b) determining if the Engine Acceleration (EA) rate is less than a Free Engine Acceleration (FEA) rate, whereby a false Neutral condition is detected when the Engine Acceleration (EA) rate is less than a Free Engine Acceleration (FEA) rate. When the false Neutral condition is detected, the transmission is retained in the currently engaged ratio (GR). When the false Neutral condition is not detected, the transmission is allowed to continue with downshift synchronization.

In an alternative embodiment of the invention, a determination is made as to whether the Absolute Value of the rotational speed of the output shaft (OS) times the currently engaged gear ratio (GR) minus the rotational speed of the input shaft (IS) is less than a predetermined value (ABS ((OS*GR)−IS)), and if so, then a false Neutral condition is detected.

DESCRIPTION OF THE PREFERRED EMBODIMENT

Figure 1:
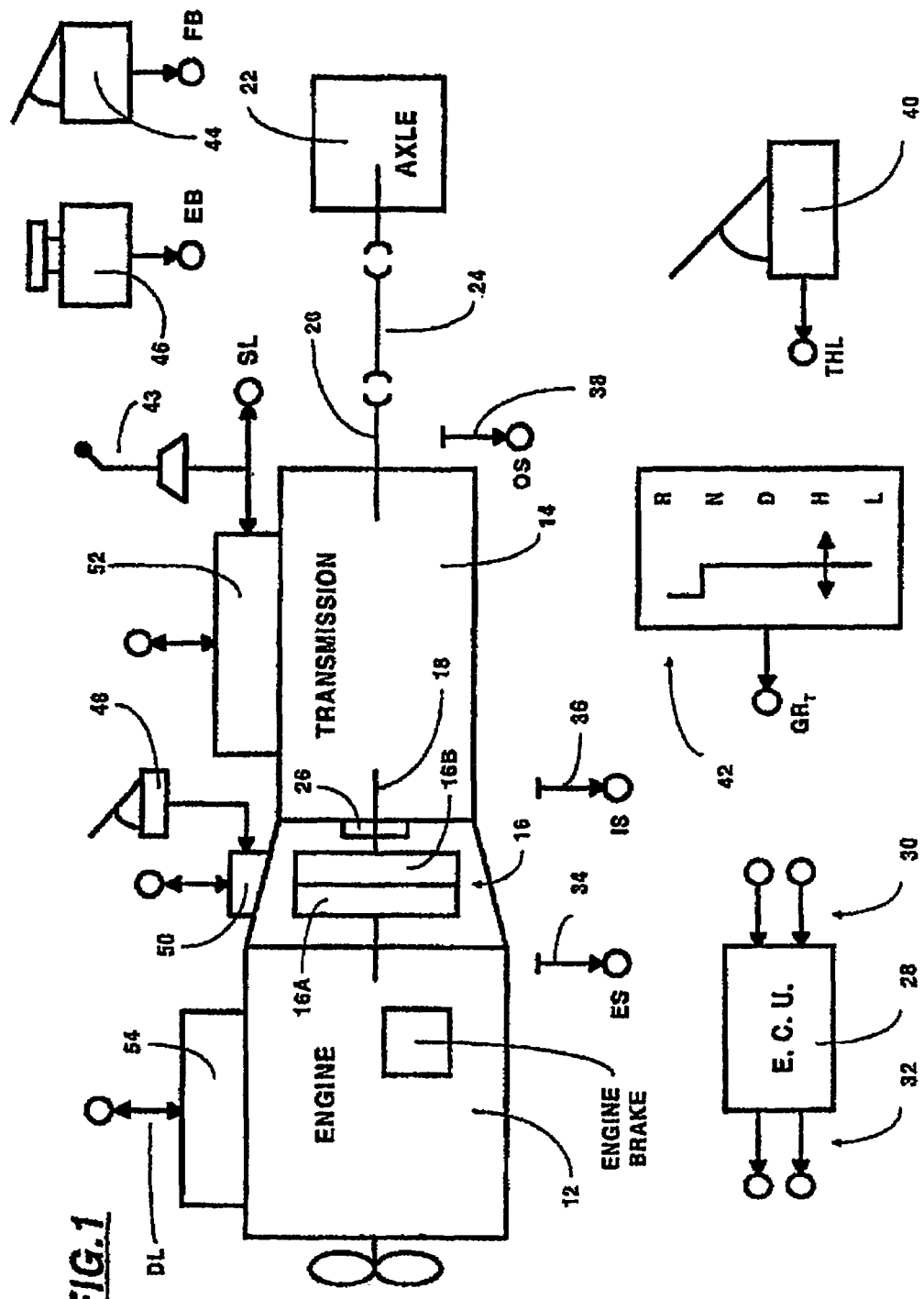
FIG. 1 is a schematic illustration, in block diagram format, of an automated mechanical transmission system utilizing the control of the present invention.

In the present description of the preferred embodiment, certain terminology will be used for descriptive purposes only and is not intended to be limiting. The terms "upward," "downward," "rightward" and "leftward" will refer to directions in the drawings to which reference is made. The terms "inward" and "outward" refer to directions towards and away from, respectively, the geometric center of the device, or portion thereof, being described. The above applies to derivatives of the terms above specifically mentioned and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one and two ratios, respectively, from fourth and fifth speed, respectively, in the downshift direction.

The term "blocked transmission" or "blocked transmission section" shall designate a change gear constant mesh transmission or transmission section, wherein a selected one of a plurality of axially movable gears is nonrotatably coupled to a shaft as a result of axial movement of the selected gear from the neutral to the engaged position thereof, and by means of a resiliently biased positive clutch. A blocker is utilized to prevent such engagement until the members of the positive clutch are at substantially synchronous rotation. Such a synchronous condition is achieved by manual and/or automatic manipulation of the transmission input and/or output shafts to cause a crossing of synchronous condition therebetween. However, it is not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196; 4,440,037 and 4,735,109, the disclosures of which are incorporated herein by reference.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445, the disclosures of which are incorporated herein by reference.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986, the disclosure of which is incorporated herein by reference.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

As is known, if the clutch is engaged, the rotational speed of the engine may be determined from the speed of the input shaft and/or the speed of the output shaft and the engaged transmission ratio (ES=IS=OS*GR).

Alternatively, for systems wherein at least some of the shifting is controlled by a manual shift lever 43, a sensor may be provided for providing an input signal (SL) indicative of the position of the shift lever. Systems of this type will include systems having a manually shifted main section and an automated splitter section. Sensors of this basic type maybe seen by reference to U.S. Pat. No. 5,743,143, the disclosure of which is herein incorporated by reference.

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850,236, 5,272,939 and 5,425,689, the disclosures of which are incorporated herein by reference). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391, the disclosures of which are incorporated herein by reference. Actuator 52 may shift the main and/or auxiliary section of transmission 14. The engaged and disengaged condition of clutch 16 may be sensed by a position sensor (not shown) or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

As is known, for automated shifting, the ECU 28 must determine when upshifts and downshifts are required and if a single or skip shift is desirable (see U.S. Pat. Nos. 4,361,060; 4,576,065; 4,916,979 and 4,947,331, the disclosures of which are incorporated herein by reference).

Figure 2:
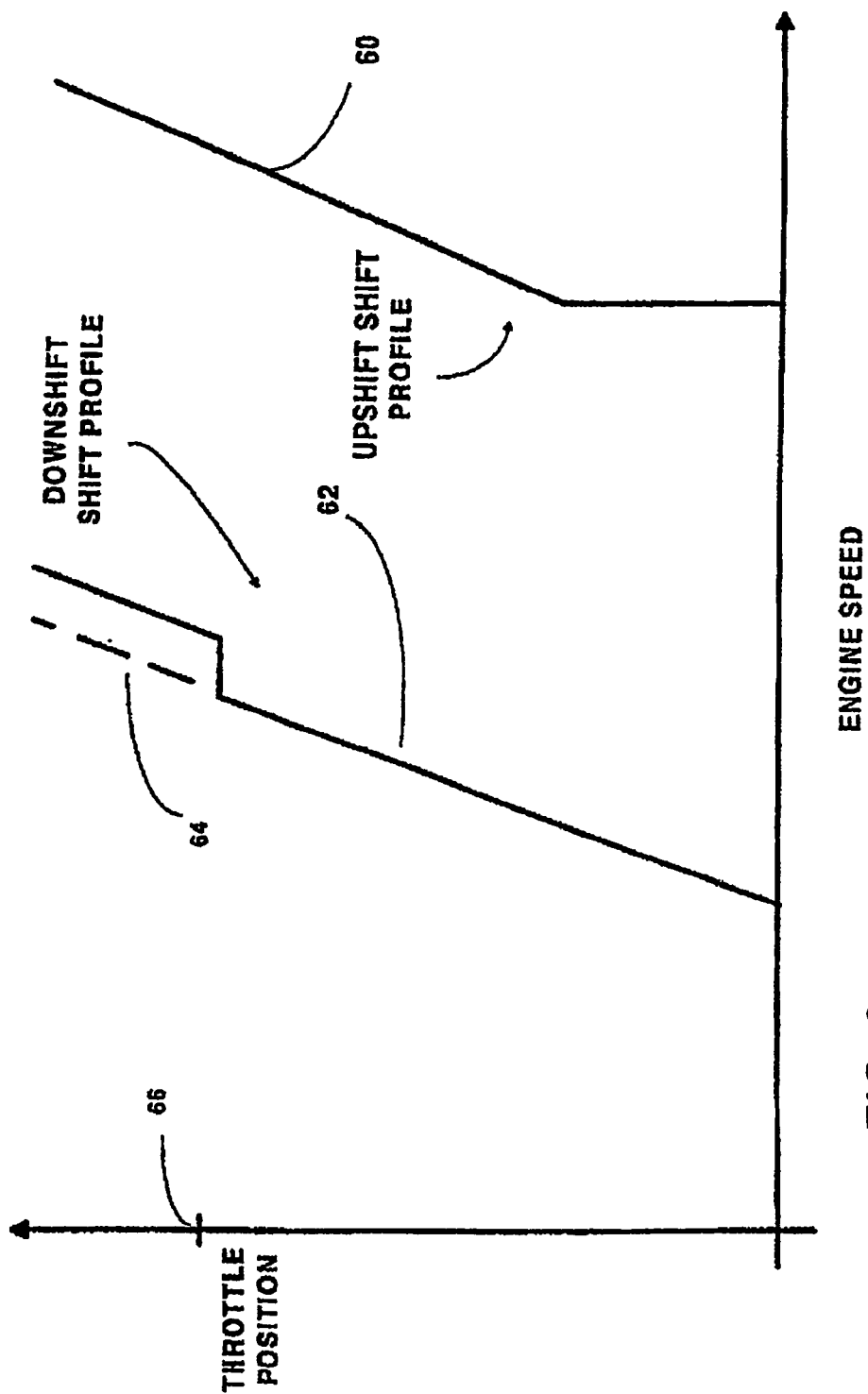
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

Shift profile 60 is a graphical representation of the engine speeds at which upshifts from a currently engaged ratio (GR) are indicated ($ES_{U/S}$) for various degrees of throttle displacement (i.e., demand).

Shift profile 62 is a graphical representation of the engine speeds ($ES_{D/S}$) at various levels of throttle position, at which a downshift from a currently engaged gear ratio (GR) into a lower ratio (GR−N, N=1, 2, 3) is indicated. In the prior art (see dashed line 64), it is known that the downshift engine speed increases with increased throttle position (i.e., increased driver demand for engine speed and torque)

In the present invention, there is a step increase in the value of $ES_{D/S}$ above a predetermined throttle displacement value 66 selected at about 80% to 100% displacement. Briefly, if THL<80% −100%, a coast downshifting condition is assumed to exist while above this value, a power downshifting condition is assumed to exist.

As is known, all or portions of shift profiles 60 and 62 are subject to movement under various operating conditions.

According to the control of the present invention, if a downshift from a currently engaged ratio (GR) is required, system 10 will increase the rotational speed of the transmission input shaft 18 to the new synchronous speed for the desirable downshift target gear ratio ($GR_{TARGET}$). This downshifting condition can be accomplished by either initiating a sequence for identifying the desirable downshift target gear ratio ($GR_{TARGET}$) or controlling the engine torque to produce the desired rotational speed of the transmission input shaft 18. Normally, the downshift condition will result in an Engine Acceleration (EA) rate at or near the Free Engine Acceleration (FEA) rate. However, if the system 10 is in a false Neutral condition, (i.e. the system 10 believes that the transmission 14 is in Neutral when actually the transmission 14 is in a gear during the downshift condition), then the increasing the engine speed may create a potentially undesirable situation. It should be noted that the present invention can be applied to any downshift condition, such as a power downshift, an automatic downshift, an automatic power downshift condition, or the like.

In general, one embodiment of the present invention provides a method of detecting a false Neutral condition of the system 10 and take appropriate action when a false Neutral condition is detected. When a false Neutral condition occurs, the Engine Acceleration (EA), i.e., the rate of change of engine speed (ES) as a function of time, will be limited by the added mass of the vehicle. By monitoring and comparing with a Free Engine Acceleration (FEA) rate during downshift synchronization, a false Neutral condition can be detected and appropriate action taken.

Figure 3:
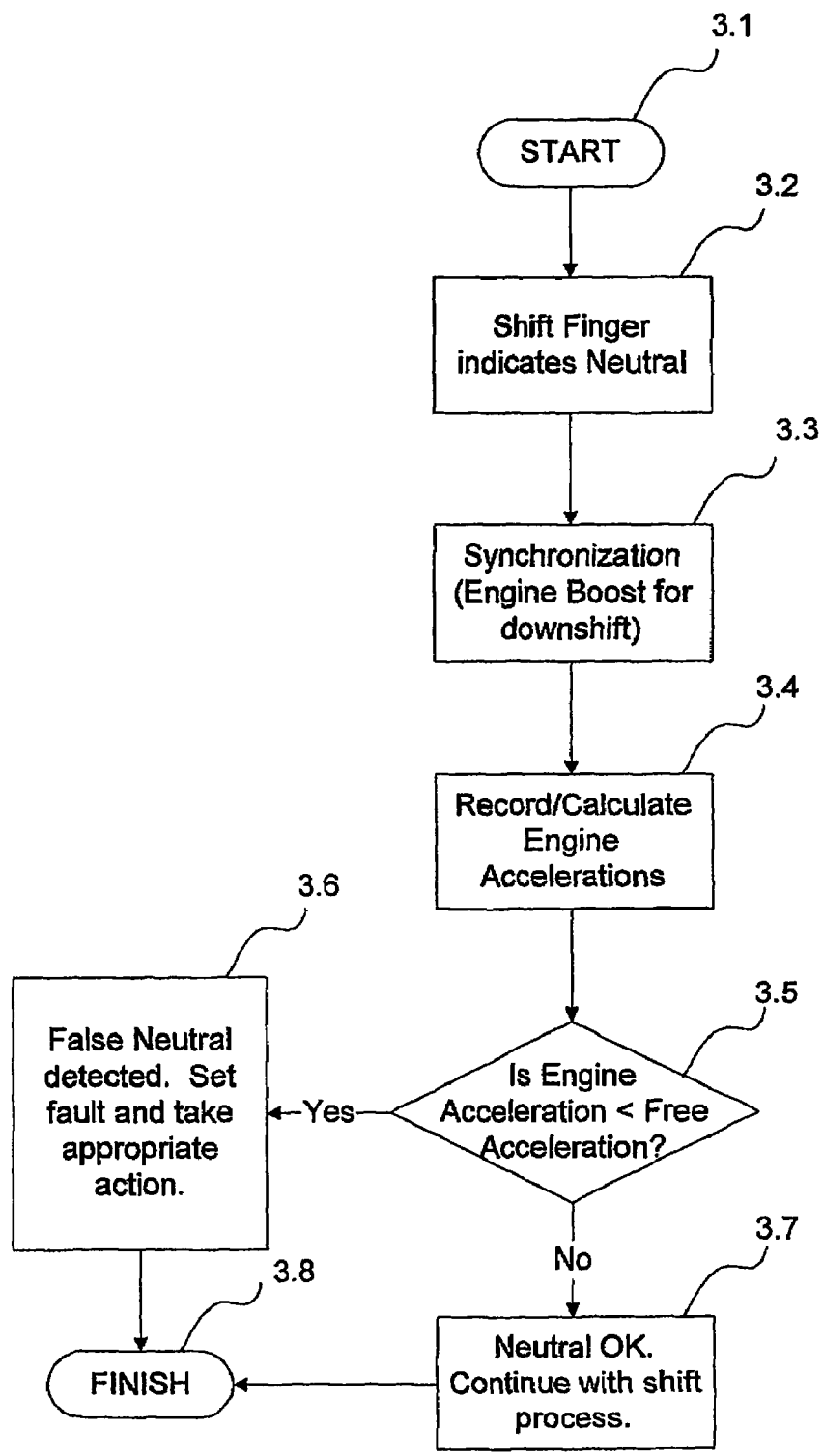
FIG. 3 is a schematic illustration in flow chart format of the control according to one embodiment of the present invention.

Specifically, the control logic of one embodiment of the present invention is shown in flow chart format in FIG. 3 beginning at start point 3.1. According to the control logic of the present invention, an engine boost for automatic downshift at point 3.3 will occur when the output signal ($GR_T$) from the shift control console 42 indicates a neutral position at point 3.2.

During the automatic power downshift to the desired downshift target gear ratio ($GR_{TARGET}$), the Engine Acceleration (EA), i.e., the rate of change of engine speed (ES) as a function of time, is monitored and/or recorded by the ECU 28 to calculate the Engine Acceleration (EA) rate as shown at point 3.4. Then, the ECU 28 compares the Engine Acceleration (EA) rate to the Free Engine Acceleration (FEA) rate as shown at decision point 3.5. The Free Engine Acceleration rate is defined as a predefined value that depends on the engine manufacturer and is not the same for all manufacturers. The Free Engine Acceleration rate can also be a learned value once the manufacturer (or the like) has set an initial value. Typically, the Free Engine Acceleration rate may be, for example, approximately 1200 rpm/s.

If the Engine Acceleration (EA) rate is less than the Free Engine Acceleration (FEA) rate, then a false Neutral is detected, a fault condition is set, and the transmission 14 is retained in the currently engaged ratio (GR), as shown at point 3.6. In other words, if the difference between the Free Engine Acceleration (FEA) rate and the Engine Acceleration (EA) rate is greater than a predetermined value, then a false Neutral is detected and the appropriate action is taken. If the engine acceleration (EA) rate is not less than the Free Engine Acceleration (FEA) rate, then the downshift is continued as shown at point 3.7 until the transmission 14 reaches the target gear ratio ($GR_{TARGET}$). The control logic terminates at finish point 3.8.

Although the Engine Acceleration (EA) rate and Free Engine Acceleration (FEA) rate can be used to detect a false Neutral condition, other external events, such as the engine operating in a degraded mode or a faulty or sticking engine/exhaust brake system, may also effect the Engine Acceleration (EA) rate. An alternative approach to detecting a false Neutral condition is to determine whether the rotational speed of the input shaft (IS) and the rotational speed of the output shaft (OS) remain in synch with respect to the previously engaged gear ratio during downshift synchronization. One approach for minimizing the possibility of false readings due to engine synchronizing based on input and output shaft speeds is described in U.S. Pat. No. 5,682,790, the disclosure of which is incorporated herein by reference.

Figure 4:
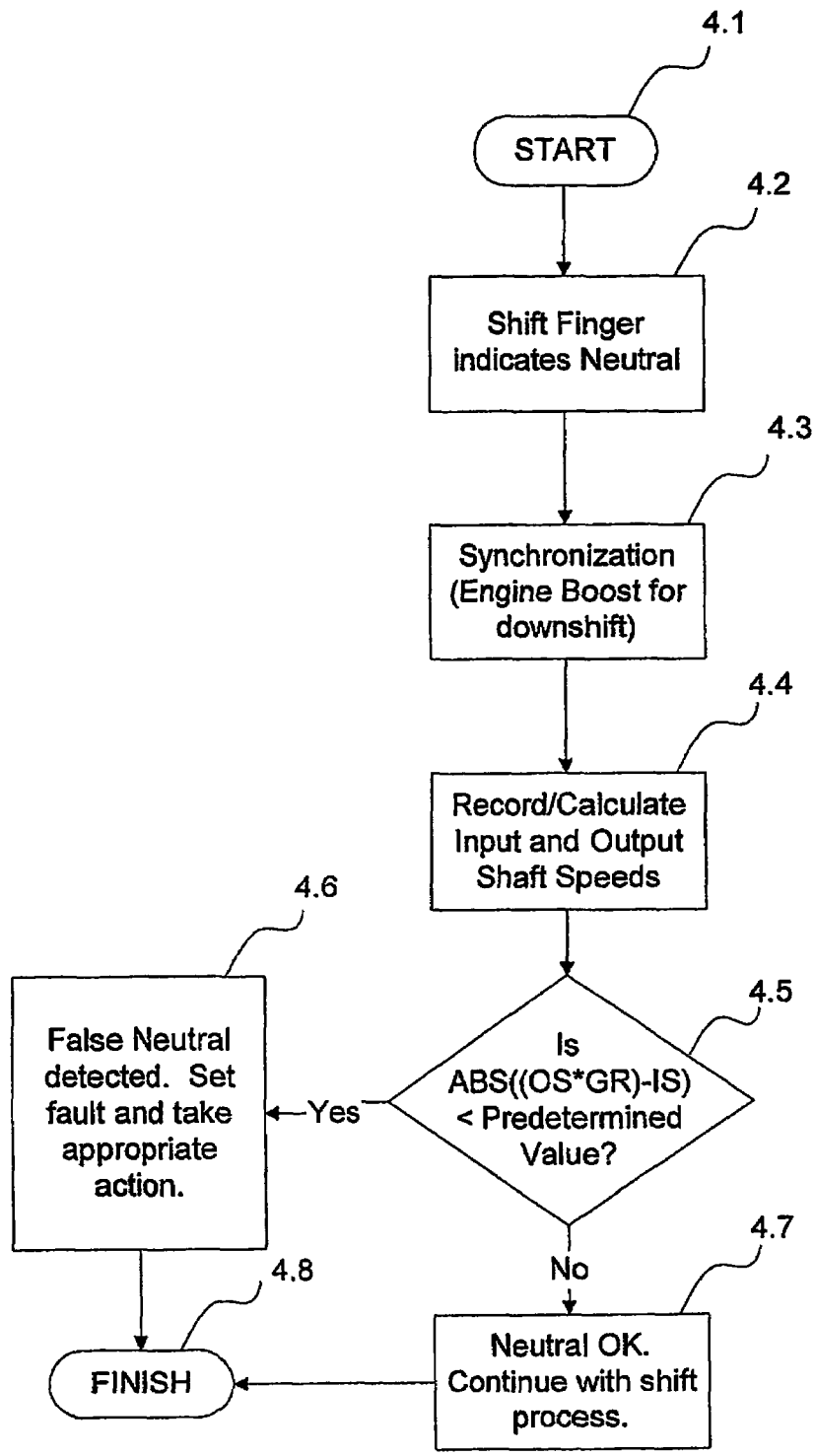
FIG. 4 is a schematic illustration in flow chart format of the control according to an alternate embodiment of the present invention.

Specifically, the control logic of an alternative embodiment of the present invention is shown in flow chart format in FIG. 4 beginning at start point 4.1. According to the control logic of this embodiment of the present invention, an engine boost for automatic downshift at point 4.3 will occur when the output signal ($GR_T$) from the shift control console 42 indicates a neutral position at point 4.2.

During the automatic power downshift to the desired downshift target gear ratio ($GR_{TARGET}$), the rotational speed of the input shaft (IS) and the rotational speed of the output shaft (OS) are monitored and/or recorded by the ECU 28 as shown at point 4.4. Then, the ECU 28 compares the rotational speeds of the input and output shafts during downshift synchronization with the rotational speeds of the input and output shafts of the currently engaged gear ratio (GR) as shown at decision point 4.5. If the ABS((OS*GR)−IS) <predetermined value, then a false Neutral is detected, a fault condition is set, and the transmission 14 is retained in the currently engaged gear ratio (GR), as shown at point 4.6. The predetermined value depends on the engine manufacturer and is not the same for all manufacturers. The predetermined value can also be a learned value once the manufacturer (or the like) has set an initial value. If the ABS ((OS*GR)−IS)>predetermined value, a fault condition is not set, and the downshift is continued as shown at point 4.7 until the transmission 14 reaches the target gear ratio ($GR_{TARGET}$). The control logic terminates at finish point 4.8.

Accordingly, it may be seen that an improved control system/method for controlling downshifting in an at least partially automated mechanical transmission system in a vehicle is provided.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for controlling automatic downshifting in a vehicular automated mechanical transmission system for a vehicle comprising a fuel-controlled engine, a multiple-speed mechanical transmission, and a controller for receiving input signals including one or more of signals indicative of engine speed, engaged gear ratio and vehicle speed, and for processing said input signals in accordance with logic rules to issue command output signals to transmission system actuators including a transmission actuator effective to shift said transmission, said method including the steps of:
(a) determining an Engine Acceleration rate during a downshift from a currently engaged ratio to a desired downshift target gear ratio;
(b) determining if said Engine Acceleration rate is less than a Free Engine Acceleration rate,
whereby a false Neutral condition is detected when said Engine Acceleration rate is less than said Free Engine Acceleration rate.

2. The method according to claim 1, further comprising the step of retaining said transmission in said currently engaged ratio when the false Neutral condition is detected.

3. The method according to claim 1, further comprising the step of continuing with the downshift to said target gear ratio when the false Neutral condition is not detected.

4. A method for controlling automatic downshifting in a vehicular automated mechanical transmission system for a vehicle comprising a fuel-controlled engine, a multiple-speed mechanical transmission, and a controller for receiving input signals including one or more of signals indicative of engine speed, engaged gear ratio and vehicle speed, and for processing said input signals in accordance with logic rules to issue command output signals to transmission system actuators including a transmission actuator effective to shift said transmission, said method including the steps of:
(a) determining an Engine Acceleration rate during a downshift from a currently engaged ratio to a desired downshift target gear ratio;
(b) determining if said Engine Acceleration rate is less than a Free Engine Acceleration rate, and if not, then continuing with the downshift to said target gear ratio, and if so, then retaining said transmission in said currently engaged ratio.

5. A method for controlling automatic downshifting in a vehicular automated mechanical transmission system for a vehicle comprising a fuel-controlled engine, a multiple-speed mechanical transmission, and a controller for receiving input signals including one or more of signals indicative of engine speed, engaged gear ratio and vehicle speed, and for processing said input signals in accordance with logic rules to issue command output signals to transmission system actuators including a transmission actuator effective to shift said transmission, said method including the steps of:
(a) determining an Engine Acceleration rate during a downshift from a currently engaged ratio to a desired downshift target gear ratio;
(b) determining if a difference between a Free Engine Acceleration rate and said Engine Acceleration rate is greater than a predetermined value, and if not, then continuing with the downshift to said target gear ratio, and if so, then retaining said transmission in said currently engaged ratio.

6. A control system for controlling automatic downshifting in a vehicular automated mechanical transmission system for a vehicle comprising a fuel-controlled engine, a multiple-speed mechanical transmission, and a controller for receiving input signals including one or more of signals indicative of engine speed, engaged gear ratio and vehicle speed, and for processing said input signals in accordance with logic rules to issue command output signals to transmission system actuators including a transmission actuator effective to shift said transmission, said control system including logic rules for:
(a) determining an Engine Acceleration rate during a downshift from a currently engaged ratio to a desired downshift target gear ratio;
(b) determining if said Engine Acceleration rate is less than said Free Engine Acceleration rate,
whereby a false Neutral condition is detected when said Engine Acceleration rate is less than a Free Engine Acceleration rate.

7. The control system of claim 6, wherein said transmission is retained in said currently engaged ratio when the false Neutral condition is detected.

8. The control system of claim 6, wherein the downshift to said target gear ratio is continued when the false Neutral condition is not detected.

* * * * *